H. J. WEIERHAUSER.
CALCULATING YARDSTICK.
APPLICATION FILED MAY 12, 1910.
986,661.
Patented Mar. 14, 1911.
2 SHEETS—SHEET 1.
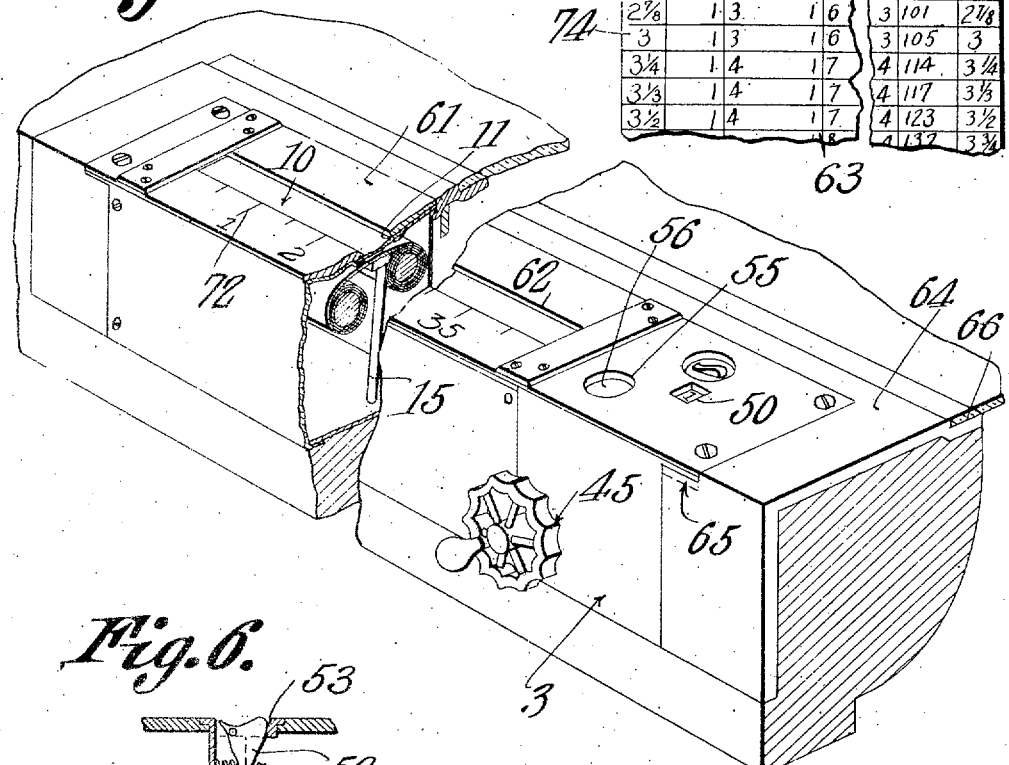
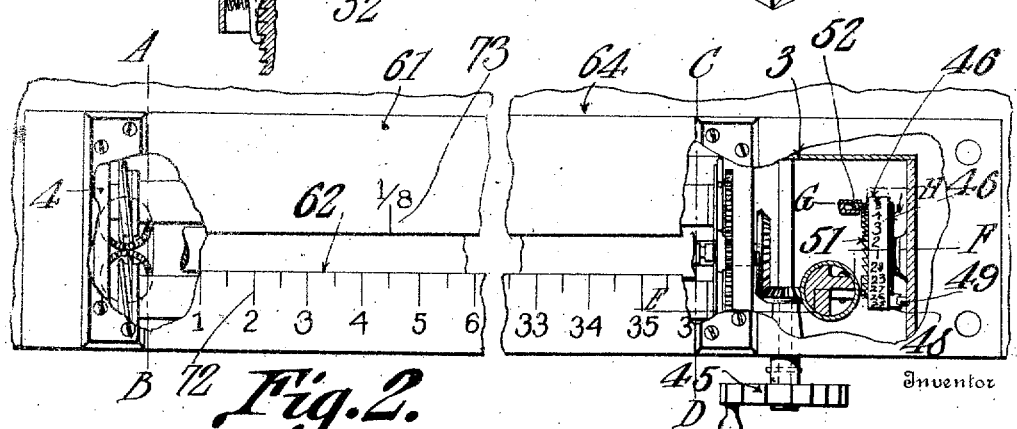
Henry J. Weierhauser.

H. J. WEIERHAUSER.
CALCULATING YARDSTICK.
APPLICATION FILED MAY 12, 1910.
986,661.
Patented Mar. 14, 1911.
2 SHEETS—SHEET 2.
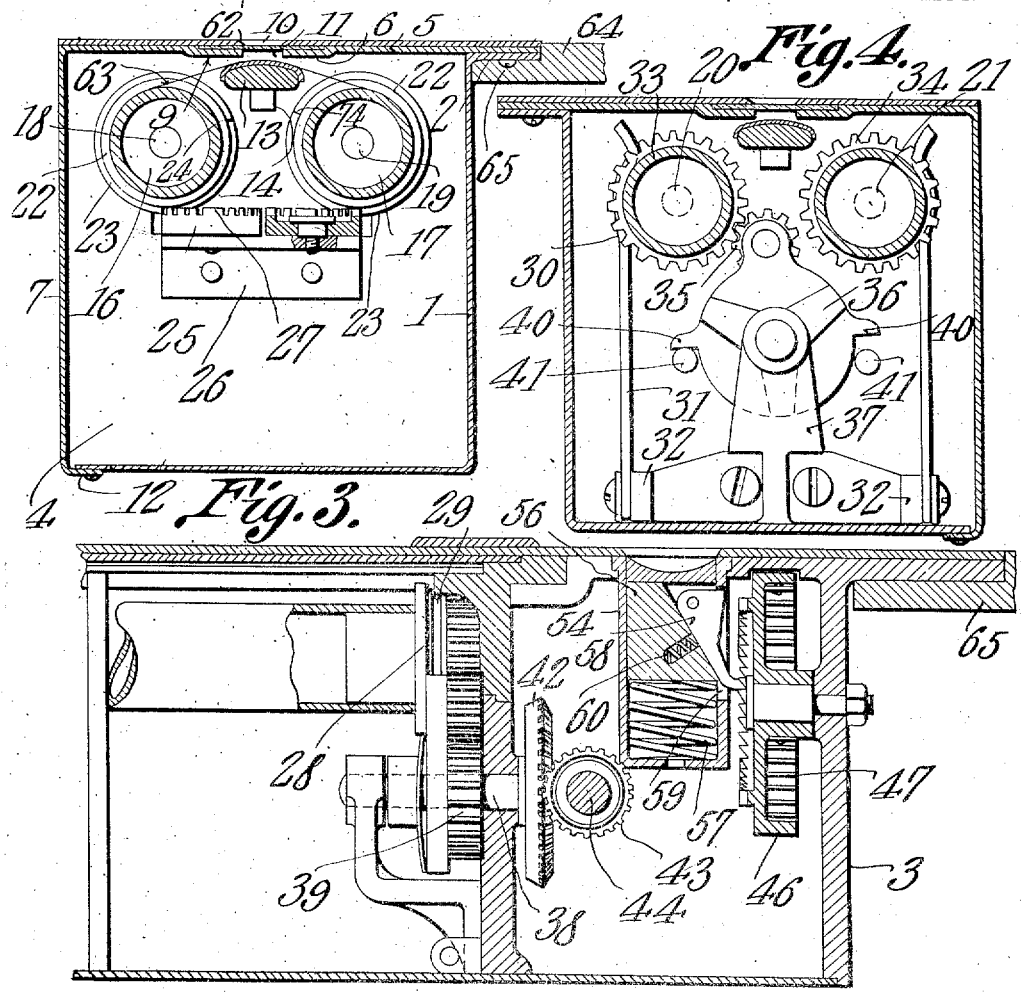
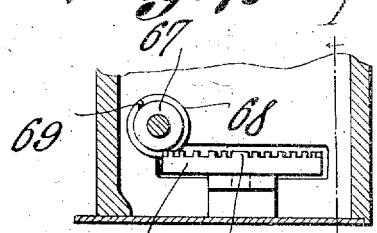
Inventor
Henry J. Weierhauser.
By C. A. Snow & Co.
Attorneys

UNITED STATES PATENT OFFICE.

HENRY J. WEIERHAUSER, OF SAN ANTONIO, TEXAS, ASSIGNOR OF ONE-HALF TO ALFRED CLIFTON McDANIEL AND ONE-HALF TO WASHINGTON PATRICK LOBBAN, OF SAN ANTONIO, TEXAS.

CALCULATING-YARDSTICK.

986,661.     Specification of Letters Patent.     Patented Mar. 14, 1911.

Application filed May 12, 1910. Serial No. 560,970

*To all whom it may concern:*

Be it known that I, HENRY J. WEIERHAUSER, a citizen of the United States, residing at San Antonio, in the county of Bexar and State of Texas, have invented a new and useful Calculating-Yardstick, of which the following is a specification.

This invention relates to calculating yard sticks of that type shown, for example, in the patent to Praeger, No. 630,005, dated August 1, 1899.

One of the objects of the present invention is to simplify and otherwise improve upon the construction of said patented device and to improve upon and to provide a chart mounted upon two spools, there being mechanism whereby motion may be positively transmitted from a single actuating element to either of said spools, according to the direction in which the chart is to be moved.

A still further object is to provide improved means whereby the spools can be brought to a stop automatically during the unwinding of the end portions of the chart, the said stop devices thus serving to prevent the chart from becoming torn from the spools.

Another object is to provide an improved form of casing and support therefor, the said casing being readily set up in its support and being dust proof so as to protect the chart.

A further object is to provide a register for use in connection with the chart whereby the number of yards measured upon the device can be counted.

A further object is to provide an improved chart whereby the cost of different cloths of any number of yards from one to thirty-six, at any given price per yard shown on the chart, and the cost of different cloths of every inch from one to thirty-six, inclusive, at any given price per yard shown on the chart, can be readily shown and determined without mental calculation.

A further and one of the prime objects of the present invention is to provide and originate resilient means frictionally acting by and through the operation and application of trunnions, disks, annular grooves, springs and other mechanism, to keep the chart taut, and to make it wind tightly, evenly, and uniformly onto and from off the spools, and to make the chart revoluble so that the longitudinal column of numerals on the chart, indicating price per yard, and the cost of every inch from one to thirty-six, inclusive at that price per yard, and of every yard from one to thirty six, at that price per yard, and of every fraction of a yard at the same price per yard, will aline perfectly and simultaneously within or through the slot opening in the top plate of the casing.

With these and other objects in view the invention consists of certain novel details of construction and combinations of parts hereinafter more fully described and pointed out in the claims.

In the accompanying drawings the preferred form of the invention has been shown.

In said drawings: Figure 1 is a perspective view of a calculating yard stick embodying the present improvements and inventions, the same being shown mounted in its holder and the middle portion of the holder and yard stick being removed. Fig. 2 is a view partly in top plan and partly in section of the yard stick. Fig. 3 is an enlarged section on line A—B, Fig. 2. Fig. 4 is an enlarged section on line C—D Fig. 2. Fig. 5 is an enlarged section on line E—F Fig. 2. Fig. 6 is an enlarged section on line G—H Fig. 2. Fig. 7 is a section through the shaft of the actuating wheel and showing, in elevation, modified means for stopping the rotation of said mechanism. Fig. 8 is a section on line I—K Fig. 7. Fig. 9 is a detail view of a portion of the chart.

Referring to the figures by characters of reference 1 designates an L shaped strip of sheet metal or the like constituting the bottom and back wall of the chart casing, there being an outstanding longitudinally extending flange 2 along the upper edge of the wall portion of said strip. This plate is secured at one end to the back and bottom of a box like casing 3 while the other end of the plate is secured to the back and bottom edges of a rectangular head block 4. A longitudinally extending top plate 5 is detachably secured upon the flange 2 and extends parallel with the bottom of the plate 1, one longitudinal edge of this plate being depressed or crimped as shown at 6 and located to one side of the longitudinal center of the bottom of plate 1.

Another L shaped plate 7 is detachably secured to the front and top edges of the head block 4 and to the front and top faces of the casing 3, the top portion of this plate being extended in the direction of the top plate 5 and having its longitudinal edge depressed or crimped as shown at 9 so as to coöperate with the depressed portion 6 to form a seat for a strip of celluloid, mica, or other transparent material such as indicated at 10, this strip being designed to close the slot 11 formed between the adjoining edges of the depressed portions 6 and 9. A longitudinal flange 12 is formed along the bottom of the plate 7 and extends under and is secured to the bottom portion of the plate 1. It will thus be seen that when the plates 1, 5, and 7 are assembled with the head block 4 and the casing 3, an elongated casing having a longitudinal slot 11 in the top thereof is formed.

A supporting strip 13 is located directly under and close to the slot 11, the upper face of this strip being transversely convex and the said strip being supported at its ends upon lugs 14 projecting from the head block 4 and the casing 3. The strip may be upheld at intermediate points by posts 15 extending upwardly from the bottom of the plate 1.

Parallel spools 16 and 17 are located within the casing formed by plates 1 and 7 and at opposite sides of and slightly below the supporting strips 13, the trunnions 18 and 19 of the said spools being journaled within the head block 4 while the trunnions 20 and 21 thereof are journaled within the casing 3. Each of the trunnions 18 and 19 has a disk 22 secured to it and provided, upon its periphery, with a spiral rib or thread 23 terminating at each end in an abrupt shoulder 24. Each of the threads engages the teeth of a gear 25 journaled upon a bracket 26 which is secured to the head block 4, one of the teeth of each gear being of greater width than the remaining teeth, as shown at 27, so that when the gear 25 has completed one revolution, the shoulder 24 will come into contact with the broad tooth 27 and thus prevent the thread 23, disk 22 and the spool to which it is connected, from rotating any further in that direction. It will be seen that by properly proportioning the gear 25 and the thread 23, any predetermined number of revolutions of the spool can be had before the spool is brought to a stop in the manner described.

Each of the trunnions 20 and 21 is provided with a disk 28 in which is formed an annular groove 29. The bowed end portion 30 of a spring 31 is normally seated within each of these grooves, the lower ends of the springs being secured to lugs 32 extending from the casing 3. It will be apparent therefore that these springs constantly bear against the surfaces of the grooves with sufficient pressure to prevent the spools and chart from rotating too freely and to keep the chart taut on the spools.

A gear 33 is secured to the trunnion 20 and another similar gear 34 is secured to the trunnion 21. These gears do not mesh but are disposed at opposite sides of a shifting gear 35 carried by a rocking plate 36. This plate 36 is pivotally supported upon a bracket 37 carried by the casing 3, the shaft 38 on which the plate 36 is mounted, being provided with a gear 39 which constantly meshes with the gear 35. Stop ears 40 extend laterally from the plate 36 and stop pins 41 are arranged in the path thereof, these pins being extended from the casing 3. A beveled gear 42 is secured to the shaft 38 and is located within the casing 3, this gear meshing with a smaller gear 43 which is keyed or otherwise secured to an actuating shaft 44. Said shaft extends transversely of the casing 3 and beyond the front face thereof, there being a hand wheel 45 or any other suitable means whereby the shaft can be readily manipulated.

A hollow dial 46 is mounted for rotation within the casing 3, and has a coiled spring 47 housed therein, the said spring being so connected and mounted as to hold the dial normally in a predetermined position, there being a projecting ear 48 upon the dial which normally contacts with a stop pin 49 extending from the casing 3. Numerals or other indicating data may be arranged in proper succession upon the periphery of the dial, said characters being designed to appear successively within an opening 50 formed in the top of the casing 3. Ratchet teeth 51 are formed on one face of the dial and are adapted to be successively engaged by a spring pressed pawl 52 which is pivotally mounted within an opening 53 formed in the top of the casing 3. This pawl serves to hold the dial against return movement, after it has been rotated a pre-determined distance against the stress of the spring 47 therein. A guide casing 54 extends downwardly into the casing from an opening 55 in the top thereof and has a button 56 slidably mounted therein and normally supported by a spring 57 located in the bottom portion of the casing 54. A dog 58 is pivotally mounted within the bottom and projects through a slot in the casing 54, said dog being spring-pressed as indicated at 60 and normally engaging one of the teeth of the ratchet 51. It will be apparent therefore that when the button 56 is depressed, the dog 58 carried thereby will partly rotate the dial 46 and thus cause another character to appear within the opening 50. After the dial has been rotated in this manner, it can be returned to its normal position by pressing downwardly on the pawl 52 so as to release the d... whereupon the spring 47 will turn the d... backward until the lug 48 comes into contact with the stop pin 49.

A longitudinally slotted top plate 61 is secured upon the head block 4 and the casing 3 and upon the plates 5 and 7, the slot 11 and 62 in this plate 61 registering together and being preferably one yard long. Graduations, representing a standard gage rule thirty-six inches long, are formed, along one edge of this slot 62, in said plate 61 so as to indicate inches and fractions of inches from one to thirty-six, inclusive, as shown at 72, and along the other edge of said slot 62 in said plate 61 so as to indicate fractions of the yard as indicated at 73.

The chart 63 used in connection with the mechanism herein described consists of a strip of paper, fabric, or the like, the width of which is the same as the length of the slot 62, preferably thirty-six inches long, said strip, or chart, having been indicated at 63. The ends of this strip are secured in any suitable manner to the two spools 16 and 17 and that face of the strip which is exposed through the slot 11 and 62 is provided with perpendicular, parallel, lines running from end to end of the chart 63, and drawn at intervals of one inch apart, except that the first marginal inch space on either side of the chart 63 is again divided so as to form a space or column on the extreme margin of either side of the chart 63, for the prices per yard, as indicated at 74, at which the goods or materials are to be sold and computed. The chart 63 also has similar parallel lines drawn across the chart from side to side, at regular intervals, but any distance apart that may be desired, and in the parallelograms thus formed by the crossing of on the left of the perpendicular lines, are shown, on the extreme margins at 74, the prices per yard at which the goods or materials are to be sold and computed, and at 75, on the left of the perpendicular lines, are shown the cost of any given number of inches, from one to thirty-six, at the given price per yard shown in that longitudinal column at 74, and at 76 on the right of the perpendicular lines, are shown the numerals indicating cost of any given number of yards at the marginal price per yard shown in that particular longitudinal column at 74, and similarly are shown the cost of fractional parts of the yard by one-eighth, one-fourth, one half, and multiples thereof, as well as the cost of any fractional part of the yard desired. The numerals indicating the price per yard, as at 74, with the numerals indicating the cost of any number of inches, from one to thirty-six, inclusive, at that same price per yard, as at 75, with the numerals indicating the cost of any number of yards, from one to thirty-six, at that same price per yard, as at 76, together with the numerals indicating the cost of a fractional part of a yard, at that same price per yard, are so arranged on the chart 63, that all of those numerals indicating cost of inches, yards, and fractions of the yard, at a given price per yard, that are included in one longitudinal column will appear, simultaneously, within the slot 11 and 62. And the chart 63 is so adjusted and attached to the spools 16 and 17 that the perpendicular lines thereon, drawn at parallel intervals of one inch apart, will register exactly under the perpendicular lines on the measuring rule 72, indicating inch measurements, as the same are represented and indicated on the top plate 61. And the cost of a required number of inches, at a given price per yard, is indicated by those numerals immediately to the left of that particular perpendicular line which indicates the number of inches required, and, similarly, the cost of a required number of yards, at a given price per yard, is indicated by those numerals immediately to the right of that particular perpendicular line which indicates the number of yards required, and similarly are shown the cost of fractional parts of the yard. In each longitudinal column are numerals indicating the price per yard, and the cost of every inch, from one to thirty-six, inclusive, at that price per yard, and also indicating the cost of every yard, from one to thirty six, at that price per yard, as well as the cost of the fractional parts of the yard at that price per yard.

The device which has been described is designed to be seated along the inner edge of the top of a store counter, or the like, and should it be desired to mount it upon the upper edge or portion of a glass showcase, a holding-plate, such as has been shown at 64, may be provided, this plate being shaped to accurately fit the upper edge portion of the show case and having inwardly directed flanges 65 on which the measuring device may rest. The inner longitudinal edge of this supporting plate may be depressed as shown at 66 so as to constitute a seat for one edge portion of the glass plate forming the top of the showcase. Should it be desired to measure off two yards and a half of fabric to be sold at $4 a yard, the free end of the fabric is placed at the beginning end of the graduated 36-inch measuring rule 72, and the fabric is then stretched to the right along said measuring rule, its entire length of thirty-six inches, thus measuring one yard. The operator then presses on the button 56 and the numeral 1 will appear within the opening 50, thereby indicating that one yard has been measured. Another yard is then measured off in the same manner, and when the button 56 is again depressed the numeral 2 will appear in the opening 50, thereby indicating that two yards have been measured. An additional one half yard, or eighteen inches, is then similarly measured. Either before or after this measuring operation the chart can be shifted so as to bring into view in or beneath the slot 62, the longitudinal column of figures or numerals relating to the cost of fabric sold at $4 per yard. By referring to the numerals immediately at the right of the perpendicular line on the chart that registers with the perpendicular line on the measuring rule 72 which indicates the two-inch graduation, the cost of two yards of the fabric, selling at $4 per yard, will be disclosed, and immediately on the left of said perpendicular line on the chart, will be disclosed the numerals indicating the cost of two inches of fabric which sells at $4 per yard. The cost of the additional one half yard of fabric, selling at $4 per yard, is indicated by the numerals appearing immediately on the left of the perpendicular line on the chart registering with the perpendicular line on the measuring rule which indicates the eighteen-inch graduation. These numerals, representing cost in inches, and located immediately at the left of the perpendicular lines which register with the inch graduations on the measuring rule, are arranged in practically the same relation as those shown in the chart disclosed in Patent No. 566,867, issued to E. Praeger, on September 1st, 1896, the only difference, with respect to the numerals indicating cost of inches, being that in the present device and chart the numerals, representing cost of inches, are placed in parallel, perpendicular, columns so as to appear adjacent to, and immediately to the left of, each of the inch graduations on the chart and on the measuring rule. This is done so as to facilitate the calculation of the cost of inches or other fractions of a yard. There are other differences between the arrangement of the numerals on this chart indicating cost of yards and on the chart disclosed in the said Praeger Patent No. 566,867.

It is believed that the operation of the chart actuating mechanism will be fully understood from the foregoing description. When the wheel, or other actuating device indicated at 45, is rotated in one direction, its shaft 44 causes gear 43 to rotate gear 42 and the gear 38 is thus revolved, the gear 39 rotating with it. Said gear 39 is constantly in mesh with the gear 35 and therefore swings said gear in one direction so as to engage one of the gears 33 and 34, according to the direction in which the wheel, or other actuating device, indicated at 45 is rotated. This swinging movement of gear 35 is of course permitted by the swinging plate 36. Motion will of course be transmitted through gear 35 to the gear 33 or 34 meshing with it and this driven gear will wind the chart upon the spool connected to it, while the said chart will be unwound from the other spool. The rotation of the free spool will be retarded to a slight extent by the pressure of the spring 31, which pressure is also intended to keep the chart taut and to make it wind evenly, and to prevent it winding loose onto the spools. After the spools have rotated a sufficient number of times to unwind practically all of the chart, the shoulder formed by the end of each worm 28 will come into contact with the broad tooth 27 of the gear 25 meshing with the worm and further rotation of each spool will thus be prevented. Obviously this will prevent the chart from being torn off of the spools. Reverse chart and obtain similar results.

Instead of providing stop mechanism at the far end of each of the spools and as shown in Figs. 2 and 3 of the drawings, one stop device may be located within the casing 3. This stop device consists of a disk 37 secured to the shaft 44 and having a spiral thread 68 thereon terminating in an abrupt shoulder 69. This thread meshes or engages with the teeth on a disk or gear 70 mounted for rotation within the casing 3, one of the teeth on said gear being broader than the others, as shown at 71 so that after the gear 70 has made a complete rotation, the shoulder 69 will move against the tooth 71 and thus hold the mechanism against further rotation in the same direction.

As heretofore pointed out, after a number of yards have been indicated by depressing the button 56 and causing the dial 46 to revolve, the said dial can be reset simply by depressing the dog 52 so as to release the dial and permit its spring, weight, or other device, 47 to swing it back to its initial position.

It is to be understood of course that various changes may be made in the construction and arrangement of the parts without departing from the spirit or sacrificing any of the advantages of the invention as defined in the appended claims.

What is claimed is:—

1. A device of the class described including a housing, parallel spools mounted for rotation therein, a chart connecting and adapted to be wound upon the spools, there being a slot within the housing through which the chart is visible, non-meshing gears carried by the respective spools, a swinging gear interposed there-between, revoluble actuating means having fixed bearings, and mechanism operated by the rotation of said means for first shifting the movable gear into mesh with either of the gears of the spools and then rotating said movable gear.

2. A device of the class described including parallel spools, a chart connecting and adapted to be wound upon the spools, non-meshing gears carried by the spools, a gear mounted for swinging movement between the gears on the spools, a revoluble actuating device having fixed bearings, and means operated by the rotation of said device for first swinging the said movable gear into mesh with either of the spool gears and for then transmitting motion from the actuating device through said swinging gear to the spool gear meshing therewith.

3. A device of the class described including spools, a chart secured to and adapted to be wound upon the spools, a revoluble actuating device having fixed bearings, means operated by the revoluble actuating means for selecting and rotating either of the spools.

4. A device of the class described including spools, a chart secured to and adapted to be wound upon the spools, resilient means for retarding the rotation of the spools and to keep the chart taut and to make the chart wind evenly and uniformly onto the spools, a revoluble actuating device having a fixed bearing, gears connected to the respective spools, and means operated by the revoluble actuating device for successively selecting and rotating either of the gears.

5. A device of the class described including spools, a chart secured to and adapted to be wound upon the spools, a gear secured to each spool, a shaft having fixed bearings, a plate loosely mounted upon the shaft, a gear secured to the shaft, a swinging gear fulcrumed upon and movable with the plate, and means for rotating the shaft in one direction to first swing the plate to bring the swinging gear into mesh with either of the gears on the spools and to then rotate the gears.

6. A device of the class described including spools, a chart secured to and adapted to be wound upon the spools, an actuating device, means operated thereby for selecting and rotating either of the spools, a threaded element revoluble in unison with the spools, the thread upon said element having a shoulder at one terminal thereof, and a gear engaged by the thread, said gear including a tooth constituting an abutment for the shoulder.

7. A device of the class described including opposed detachably connected angular plates constituting a casing, a top plate cooperating with one of the first mentioned plates to constitute the top of the casing, there being a longitudinal slot within said top, a transparent closure for said slot, a slotted graduated top plate secured upon the top of the casing, a head block secured between the plates at one end thereof, a casing secured between the plates at the other end thereof, spools journaled between the head block and end casing and surrounded by the plates, a chart secured to and adapted to be wound upon the spools and mechanism mounted upon and within the end casing for actuating the spools.

8. The combination with a supporting plate having flanges extending therefrom and constituting ledges, of a structure detachably mounted upon said flanges, a chart movably mounted within said structure, there being a slot within the structure through which a portion of the chart is visible, an actuating wheel supported beyond one face of the structure, and mechanism operated by said wheels for rotating the chart in either direction.

9. A device of the class described including a housing, a chart movably mounted therein, said housing having an opening through which a portion of the chart is visible, an operating device supported in fixed bearings and extending beyond one face of the housing, mechanism operated by said device for moving the chart in either direction within the housing, and means for automatically stopping the movement of the spools and chart in either direction, until the actuating device is reversed.

10. A device of the class described including spools mounted for rotation, a chart connected to and adapted to be wound upon the spools, non-meshing gears carried by the respective spools, a swinging gear interposed therebetween, revoluble actuating means having fixed bearings, and mechanism operated by the rotation of said means for shifting the movable gear into mesh with either of the gears of the spools, and then rotating said movable gear.

In testimony that I claim the foregoing as my own I have hereto affixed my signature in the presence of two witnesses.

HENRY J. WEIERHAUSER.

Witnesses:
T. D. COBBS,
M. E. WRIGHT.